(12) United States Patent
Cataldo et al.

(10) Patent No.: US 12,179,948 B2
(45) Date of Patent: Dec. 31, 2024

(54) TIME-PRESSURE-FILLING SYSTEM FOR LIQUID DRUG PRODUCTS

(71) Applicant: Hoffmann-La Roche Inc., Little Falls, NJ (US)

(72) Inventors: Pasquale Cataldo, Mannheim (DE); Harald Heinlein, Mannheim (DE)

(73) Assignee: Hoffmann-La Roche, Inc., Little Falls, NJ (US)

( * ) Notice: Subject to any disclaimer, the term of this patent is extended or adjusted under 35 U.S.C. 154(b) by 0 days.

(21) Appl. No.: 17/819,251

(22) Filed: Aug. 11, 2022

(65) Prior Publication Data

US 2022/0380069 A1 Dec. 1, 2022

Related U.S. Application Data

(63) Continuation of application No. PCT/EP2021/053435, filed on Feb. 12, 2021.

(30) Foreign Application Priority Data

Feb. 14, 2020 (EP) .................................. 20157389

(51) Int. Cl.
*B65B 3/00* (2006.01)
*B65B 3/10* (2006.01)
(Continued)

(52) U.S. Cl.
CPC ............... *B65B 3/003* (2013.01); *B65B 3/10* (2013.01); *B65B 57/145* (2013.01); *G01F 13/006* (2013.01)

(58) Field of Classification Search
CPC .......... B65B 3/003; B65B 3/10; B65B 57/145
See application file for complete search history.

(56) References Cited

U.S. PATENT DOCUMENTS

| | | | | | |
|---|---|---|---|---|---|
| 5,346,302 | A | * | 9/1994 | Ryu | ........................ G01G 17/02 222/64 |
| 5,556,002 | A | * | 9/1996 | Green | .................... G01F 11/284 222/64 |

(Continued)

FOREIGN PATENT DOCUMENTS

| DE | 20 2015 106 349 U1 | 11/2015 |
|---|---|---|
| EP | 0 228 217 A1 | 7/1987 |

(Continued)

OTHER PUBLICATIONS

International Search Report and Written Opinion of the International Searching Authority, PCT/EP2021/053435, Jun. 4, 2021, 15 pages.

*Primary Examiner* — Timothy L Maust
(74) *Attorney, Agent, or Firm* — Bose McKinney & Evans LLP

(57) ABSTRACT

A time-pressure-filling system for filling liquid drug product into containers is disclosed. The time-pressure-filling system has a storage vessel for storing the liquid drug product and a surge vessel. The surge vessel is configured for single use and is at least partially made of a rigid plastic material. A supply line feeds the liquid drug product from the storage vessel into the surge vessel in a pressurized fashion. A pressure control line is provided for applying a control pressure to the surge vessel, a dispenser is provided for dispensing the liquid drug product into the containers, and a dispensing line connects the surge vessel to the dispenser. A pressure sensor determines pressure in the dispensing line and a valve controls flow of the liquid drug product through the dispensing line. A surge vessel for use in the time-pressure-filling system and a time-pressure-filling method are also disclosed.

15 Claims, 4 Drawing Sheets

(51) Int. Cl.
*B65B 57/14* (2006.01)
*G01F 13/00* (2006.01)

(56) References Cited

U.S. PATENT DOCUMENTS

| | | | |
|---|---|---|---|
| 5,957,171 | A | 9/1999 | Matsuo |
| 6,024,251 | A * | 2/2000 | Mayer ..................... B65B 3/003 |
| | | | 222/64 |
| 6,176,277 | B1 | 1/2001 | Mayer |
| 6,695,017 | B1 * | 2/2004 | Liedtke ................ B67D 7/0238 |
| | | | 141/4 |
| 9,278,769 | B2 * | 3/2016 | Janssens ................... B65B 3/28 |
| 10,688,021 | B2 * | 6/2020 | Tribble ..................... A61J 1/10 |
| 10,846,975 | B2 * | 11/2020 | Tansey, Jr. ................ B65B 3/10 |
| 2005/0109795 | A1 | 5/2005 | Furey et al. |
| 2012/0228325 | A1 | 9/2012 | Randall, Jr. et al. |
| 2016/0368629 | A1 * | 12/2016 | Storey ..................... B01F 25/50 |
| 2022/0380069 | A1 * | 12/2022 | Cataldo ................... B65B 3/003 |

FOREIGN PATENT DOCUMENTS

| | | |
|---|---|---|
| JP | 50-48514 A | 4/1975 |
| JP | 11-91878 A | 4/1999 |
| JP | 2000-109190 A | 4/2000 |
| JP | 2005-154008 A | 6/2005 |
| JP | 2010-42833 A | 2/2010 |
| WO | WO 00/58019 A1 | 10/2000 |

* cited by examiner

TIME-PRESSURE-FILLING SYSTEM FOR LIQUID DRUG PRODUCTS

RELATED APPLICATIONS

This application is a continuation of PCT/EP2021/053435, filed Feb. 12, 2021, which claims priority to EP 20 157 389.6, filed Feb. 14, 2020, both of which are hereby incorporated herein by reference.

BACKGROUND

This disclosure teaches a time-pressure-filling system and a time-pressure-filling method for filling at least one liquid drug product into containers. The time-pressure-filling system comprises at least one surge vessel, which is configured for single use. The devices and methods of this disclosure, as an example, may be used for filling liquid medical and pharmaceutical products into containers, such as vials, syringes, cartridges, ampoules. Other applications comprising the process of bottling a liquid are also feasible.

In the field of filling liquid drug products into containers, devices and methods known to the skilled person may comprise the use of a time-pressure-filling approach. Without narrowing the scope, this disclosure specifically may be described with respect to filling liquid drug products. It shall be noted, however, that this disclosure may also be used for filling other types of liquids into containers.

In a time-pressure-filling system, the filled volume may be determined by opening a squeeze valve for a specific time interval while a constant pressure is applied to the liquid drug product. The filled volume per time unit may be dependent on the applied pressure, the time interval and the used elements, specifically the diameter of the tube and/or of the needles. Therefore, the system has to meet the requirements for applying and maintaining a constant pressure in the system. Thus, generally devices made of stainless steel are used for this purpose.

In order to use these time-pressure-filling systems for a wide range of different liquid drug products, specifically for multi-product-filling lines, the system has to be cleaned and sterilized extensively. This implies great challenges, in particular for pharmaceutical drug products, such as liquid drug products for subcutaneous application and/or high-potent liquid drug products: The permissible toxicological residual concentrations of liquid drug products being filled after a cleaning of the system often are below an analytical detection limit. Further, very few analytical detection methods having a sufficient sensitivity are available.

Therefore, it is a major challenge to provide methods and devices, which allow for filling a wide range of many different liquid drug products using the same time-pressure-filling system while enabling the highest possible level of patient security and further avoiding possible cross contaminations.

SUMMARY

This disclosure addresses the above-mentioned technical challenges of filling at least one liquid drug product into containers. Specifically, methods and devices are taught herein which allow for filling a wide range of many different liquid drug products using the same time-pressure-filling system while enabling the highest possible level of patient security. Further, methods and devices are disclosed which overcome the need for an extensive cleaning of the time-pressure-filling system.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. It shall also be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "storage vessel," "surge vessel," "supply line," and "dispenser," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of this disclosure, a time-pressure-filling system is disclosed. The time-pressure-filling system is configured for filling at least one liquid drug product into containers. The time-pressure-filling system comprises:

A. at least one storage vessel for storing the liquid drug product;
B. at least one surge vessel, wherein the surge vessel is configured for single use, wherein the surge vessel is at least partially made of at least one rigid plastic material;
C. at least one supply line for feeding the liquid drug product from the storage vessel into the surge vessel in a pressurized fashion;
D. at least one pressure control line for applying a control pressure to the surge vessel;

E. at least one dispenser for dispensing the liquid drug product into the containers;

F. at least one dispensing line connecting the surge vessel to the dispenser;

G. at least one pressure sensor for determining a pressure in the dispensing line; and H. at least one valve for controlling a flow of the liquid drug product through the dispensing line.

The term "time-pressure-filling system" as used herein is a broad term and is to be given its ordinary and customary meaning to a person of ordinary skill in the art and is not to be limited to a special or customized meaning. The term specifically may refer, without limitation, to an arbitrary system for dispensing, releasing or conducting an arbitrary liquid, such as a pure liquid, a liquid mixture, a solution, a suspension, a dispersion or an emulsion, such as into receptacles or containers. The time-pressure filling system may be configured for controlling the volume flow of the liquid by applying a pressure to the liquid and controlling an opening time of a valve. Thus, the time-pressure-filling system may be configured for supplying a pre-defined amount of the liquid by providing the liquid at a controlled or pre-defined pressure via a line and by opening a valve for a pre-defined time span. Thus, the time-pressure-filling system may comprise at least one element containing the liquid and being configured for applying a pressure to the enclosed liquid. Further, the time-pressure-filling system, as will be outlined in further detail below, may comprise at least one valve, wherein the opening time of the valve may be controlled. The volume flow of the liquid may depend on the applied pressure, on the opening time of the valve and on the dimension or geometry of the valve, such as a diameter or a cross-section of the valve. Therefore, the time-pressure-filling system may be configured for controlling a filling volume of the liquid into the receptacles or containers. Further, the time-pressure-filling system may be configured for filling a plurality of containers in a sequential and/or in a parallel fashion via the at least one dispenser of the at least one dispensing line. As an example, the time-pressure-filling system may comprise a number of N dispensers for simultaneously filling the liquid into a batch of N containers, followed by a subsequent batch of N containers and so forth. The time-pressure-filling system may be used for filling a predetermined amount of the liquid into containers. Thus, the time-pressure-filling system may be used in industrial applications, such as for filling at least one liquid drug product into containers.

The term "liquid drug product" as used herein is a broad term and is to be given its ordinary and customary meaning to a person of ordinary skill in the art and is not to be limited to a special or customized meaning. The term specifically may refer, without limitation, to a liquid, such as a pure liquid, a liquid mixture, a solution, a suspension, a dispersion or an emulsion, wherein the liquid is usable as a medication or that may be used or prepared in the process of producing a medication or a preparation or that may be used or prepared as an interstage, a precursor or a compound of a medication or a preparation. Thus, the drug product may, for example, be used as part of or in connection with a treatment of a disease, a prevention, a prophylaxis or a diagnostic analysis.

The term "container" as used herein is a broad term and is to be given its ordinary and customary meaning to a person of ordinary skill in the art and is not to be limited to a special or customized meaning. The term specifically may refer, without limitation, to a receptacle which is adapted to one or more of contain, store or transport a liquid. Specifically, the container may be used in the field of drug products and, thus, may be adapted to one or more of contain, store or transport a liquid drug product. For example, the container may be selected from the group consisting of: a vial; a syringe; a cartridge; an ampoule.

The term "storage vessel" as used herein is a broad term and is to be given its ordinary and customary meaning to a person of ordinary skill in the art and is not to be limited to a special or customized meaning. The term specifically may refer, without limitation, to a reservoir of a liquid comprising at least one outlet and at least one pressure supply. Further, the storage vessel may be configured for storing a predetermined amount of a liquid, for example, one batch of the liquid drug product. The at least one outlet of the storage vessel may connect the storage vessel to the surge vessel via at least one supply line. The at least one pressure supply of the storage vessel may be configured for applying pressure to the liquid stored in the storage vessel. Thus, the storage vessel may further be configured for filling the surge vessel with the liquid, specifically with the liquid drug product, via the at least one supply line in a pressurized fashion. The storage vessel may be made of a metal or an alloy of metals, such as stainless steel, or may at least partially be made of at least one rigid plastic material, such as polypropylene or polyethylene. Thus, the storage vessel may be configured for single use.

The term "surge vessel" as used herein is a broad term and is to be given its ordinary and customary meaning to a person of ordinary skill in the art and is not to be limited to a special or customized meaning. The term specifically may refer, without limitation, to an arbitrary device configured for containing or storing a liquid, wherein the device has at least one supply pipe, at least one outlet connecting branch and at least one pressure control branch. The surge vessel is at least partially made of a rigid plastic material, for example, of at least one of polypropylene, polycarbonate and polyethylene, and is configured for single use. Further, the surge vessel may have a cylindrical shape. Thus, the surge vessel has a rigid cylindrical vessel sidewall, a rigid vessel bottom plate and a rigid vessel top plate. Other options are also feasible, such as a conical or a cubic shape. The at least one supply line of the surge vessel penetrates the rigid vessel bottom plate and has at least one portion protruding into an interior space of the surge vessel, for example, up to a height of 0.25-0.75% of the surge vessel, e.g., up to a height of half the height of the surge vessel. Further, the at least one supply line has at least one inlet connecting branch protruding from the rigid vessel bottom plate outside the interior space for connecting the supply line to the supply pipe. Thus, the surge vessel may be configured for being filled with the liquid, for example, with the liquid drug product, from the storage vessel. Further, the at least one portion of the supply pipe protruding into the interior space of the surge vessel may be configured for enabling a soft and turbulence-free inflow of the incoming liquid. Further, the at least one outlet connecting branch protrudes from the vessel bottom plate outside the interior space for connecting the at least one dispending line. The surge vessel may have a plurality of outlet connecting branches for connecting a plurality of dispensing lines. The plurality of outlet connecting branches may have an equal or a different diameter to each other. Further, the at least one pressure control branch protruding from the vessel top plate outside the interior space for connecting the at least one pressure control line may be configured for applying the control pressure to the liquid stored in the surge vessel. Thus, the surge vessel may be configured for feeding the liquid stored in the surge vessel, such as the liquid drug product, into the dispensing line, specifically in a pressurized fashion.

The term "single use" as used herein is a broad term and is to be given its ordinary and customary meaning to a person of ordinary skill in the art and is not to be limited to a special or customized meaning. The term specifically may refer, without limitation, to a characteristic of an element to be disposed of at the end of use. Specifically, the end of use may be determined by a predetermined scope of use and/or a predetermined time of use. Thus, elements of the time-pressure-filling system, such as the at least one surge vessel, which are configured for single use may be disposed of after their predetermined scope of use and/or their predetermined time of use. For example, the predetermined scope of use may refer to an amount of filled liquid, such as a batch of a liquid drug product. Thus, elements configured for single use may be disposable elements, for example, by being made of a disposable material, such as a plastic material, e.g., a rigid plastic material. Further, elements configured for single use may be exchanged easily and therefore, may be replaced by new elements after their predetermined scope and/or time of use has expired. Thus, the elements configured for single use may be connected to other elements by releasable connectors.

The term "rigid plastic material" as used herein is a broad term and is to be given its ordinary and customary meaning to a person of ordinary skill in the art and is not to be limited to a special or customized meaning. The term specifically may refer, without limitation, to a thermoplastic polymer. Specifically, the rigid plastic material may be moldable and formable at elevated temperature and may become solidified at the temperature of use, for example, at room temperature. Thus, the rigid plastic material may be a rigid thermoplastic polymer in the solidified state. For example, the rigid plastic material may be or may comprise at least one of polypropylene, polycarbonate or polyethylene. Other options are feasible. Further, the rigid plastic material may be a pressure-stable material. Thus, the rigid plastic material may be configured for sustaining overpressures of at least 50 mbar, e.g., in a range of 50 to 5000 mbar, specifically 50 to 3000 mbar, more specifically 50 to 1000 mbar, e.g., without macroscopic deformations, e.g., with dimensional changes of less than 20% in at least one dimension. The rigid plastic material may be at least partially transparent, specifically for light in the visible and/or infrared spectral range.

The term "supply line" as used herein is a broad term and is to be given its ordinary and customary meaning to a person of ordinary skill in the art and is not to be limited to a special or customized meaning. The term specifically may refer, without limitation, to a liquid-carrying tube, which is configured to supply the surge vessel with the liquid contained by the storage vessel. Specifically, the liquid may be a liquid drug product. Further, the supply line may comprise pressure-stable tubes. The supply line specifically may fully or partially be made of at least one plastic material and/or of at least one metal-enforced plastic material, such as at least one metal-braid-enforced plastic material. For example, the supply line may comprise one or more reinforced silicone tubes, such as braid reinforced silicone tubes or platinum reinforced silicone tubes. Thus, the supply line may be configured for feeding the liquid drug product from the storage vessel into the surge vessel in a pressurized fashion.

The term "pressurized fashion" as used herein is a broad term and is to be given its ordinary and customary meaning to a person of ordinary skill in the art and is not to be limited to a special or customized meaning. The term specifically may refer, without limitation, to a way of transporting a liquid, such as the liquid drug product, through one or more of pipes, tubes and/or vessels by applying an overpressure to the liquid. Specifically, a liquid drug product may be transported in the time-pressure-filling system in a pressurized fashion. Therefore, a pressure may be applied to the storage vessel which will transport the liquid drug product from the storage vessel to the surge vessel. Further, a control pressure may be applied to the surge vessel to feed the at least one dispensing line with the liquid drug product.

The term "pressure control line" as used herein is a broad term and is to be given its ordinary and customary meaning to a person of ordinary skill in the art and is not to be limited to a special or customized meaning. The term specifically may refer, without limitation, to a pressure-stable tube, which is configured for applying the control pressure to the surge vessel. Specifically, the pressure control line may comprise a reinforced silicone tube, such as a braid reinforced silicone tube or a platinum reinforced silicone tube. The term "control pressure" as used herein is a broad term and is to be given its ordinary and customary meaning to a person of ordinary skill in the art and is not to be limited to a special or customized meaning. The term specifically may refer, without limitation, to a pressure being applied to the surge vessel, such as for driving and/or controlling the time-pressure filling from the surge vessel. Specifically, the control pressure may be applied to the surge vessel for controlling the flow of the liquid drug product through the at least one dispensing line. The control pressure may be in the range of 50 to 1000 mbar, specifically 50 to 400 mbar.

The term "dispenser" as used herein is a broad term and is to be given its ordinary and customary meaning to a person of ordinary skill in the art and is not to be limited to a special or customized meaning. The term specifically may refer, without limitation, to an arbitrary device which is configured for releasing a liquid, for example, the liquid drug product, into containers and/or receptacles. Specifically, the dispenser may be a device which is configured for a directed release of the liquid, such as the liquid drug product, into the containers. For example, the dispenser may comprise a needle, a nozzle, a valve or a tap. The dispenser may be installed at the end of the dispensing line. Thus, the dispenser may be marking a point of fill. Further, the time-pressure-filling system may comprise at least one dispenser for each dispensing line connected to the surge vessel via the at least one outlet connecting branch.

The term "dispensing line" as used herein is a broad term and is to be given its ordinary and customary meaning to a person of ordinary skill in the art and is not to be limited to a special or customized meaning. The term specifically may refer, without limitation, to a liquid-carrying tube connecting the at least one outlet connecting branch of the surge vessel with the at least one dispenser. The dispensing line specifically may fully or partially be made of at least one plastic material and/or of at least one metal-enforced plastic material, such as at least one metal-braid-enforced plastic material. For example, the supply line may comprise one or more reinforced silicone tubes, such as braid reinforced silicone tubes or platinum reinforced silicone tubes. Specifically, the at least one dispensing line may comprise at least one pressure-stable tube, for example, at least one reinforced silicone tube, such as a braid reinforced silicone tube or a platinum reinforced silicone tube. Other options are feasible.

The term "pressure sensor" as used herein is a broad term and is to be given its ordinary and customary meaning to a person of ordinary skill in the art and is not to be limited to a special or customized meaning. The term specifically may refer, without limitation, to a device, which is configured for quantitatively or qualitatively assessing the pressure of a liquid, such as by generating at least one item of information, e.g., an electronic signal, indicative of the pressure. Specifically, the pressure sensor may be configured for assessing the pressure of the liquid drug product in the dispensing line. Thus, the pressure sensor may be integrated into at least one dispensing line. Further, the pressure sensor may determine the pressure of the liquid drug product in flow of the liquid drug product in the at least one dispensing line. Thus, the pressure sensor may comprise at least one passageway for the liquid drug product and at least one pressure sensitive element. The pressure sensor may be comprised by the dispensing line. Further, the pressure sensor may generate an electrical signal which is correlated to the pressure of the liquid, specifically of the liquid drug product, which may be passing through the pressure sensor. The pressure sensor may be configured for single use, specifically by being at least partially made of at least one rigid plastic material.

The term "valve" as used herein is a broad term and is to be given its ordinary and customary meaning to a person of ordinary skill in the art and is not to be limited to a special or customized meaning. The term specifically may refer, without limitation, to an arbitrary device configured for regulating, directing and/or controlling the flow of a liquid, such as by opening, closing and/or partially obstructing a passageway. Specifically, the opening and/or closing of the at least one valve of the time-pressure-filling system may be configured for being time-controlled. In this context, the term "opening time" may refer to a time interval in which the valve may be open and thus, may allow the liquid to pass through the valve. The opening time of the at least one valve of the time-pressure-filling system may be controllable. For example, the at least one valve comprised by the time-pressure-filling system may be or may comprise a squeeze valve. The squeeze valve may be configured for controlling the flow through the dispensing line by squeezing the tube of the dispensing line. Further, the time-pressure-filling system may comprise at least one valve for each dispensing line. Thus, the opening times of a plurality of valves may be controllable separately and/or collectively.

The at least one storage vessel and the at least one surge vessel comprised by the time-pressure-filling system may be pressure-stable vessels. Further, the at least one supply line, the at least one pressure control line and the at least one dispensing line may comprise pressure-stable tubes. The term "pressure-stable" as used herein is a broad term and is to be given its ordinary and customary meaning to a person of ordinary skill in the art and is not to be limited to a special or customized meaning. The term specifically may refer, without limitation, to a characteristic of not deforming macroscopically when subjected to pressure. In particular, a macroscopic deformation may refer to a deformation by no more than 10 percent of the initial size, specifically by no more than 5 percent, more specifically by no more than 1 percent. The initial size may refer to the size of the pressure-stable vessels and/or the pressure-stable tubes at ambient pressure condition without any additional pressure. Further, the pressure-stable vessel and/or the pressure-stable tubes may not deform macroscopically under an applied pressure up to 5000 mbar, specifically up to 3000 mbar, more specifically up to 1000 mbar.

As an example, the pressure-stable tubes may be or may comprise reinforced silicone tubes, specifically braid reinforced silicone tubes, more specifically platinum reinforced silicone tubes. As another example, the at least one surge vessel may be at least partially made of a rigid plastic material. Thus, the components of the time-pressure-filling system may be pressure-stable in a pressure range of 50 to 5000 mbar, specifically 50 to 3000 mbar more specifically 50 to 1000 mbar.

As outlined above, the time-pressure-filling system comprises at least one pressure sensor for determining a pressure in the dispensing line. The at least one pressure sensor may be arranged in the at least one dispensing line. Alternatively and/or additionally, the at least one pressure sensor may also be arranged in a bypass of the dispensing line. Thus, the pressure sensor may determine the pressure in an additional line bypassing the dispensing line. Further, the pressure sensor may also be arranged in at least one branch of the dispensing line. As another example, the pressure sensor may be arranged in a line parallel to the dispensing line. The parallel line may also be another dispensing line and/or may be an additional line designated to be used for determining a pressure with the at least one pressure sensor.

The time-pressure-filling system may optionally further comprise at least one manifold, specifically at least one manifold for single use. The term "manifold" as used herein is a broad term and is to be given its ordinary and customary meaning to a person of ordinary skill in the art and is not to be limited to a special or customized meaning. The term specifically may refer, without limitation, to a fluidic or hydraulic component controlling or regulating a fluid flow between various fluidic components, such as configured for distributing a liquid flow to a plurality of fluidic components such as a plurality of dispensing nozzles. The manifold may, thus, provide for a fluidic distributing system and/or a fluidic switchboard. The at least one manifold may be configured for single use specifically by being made of at least one rigid plastic material. Further, the at least one manifold may provide at least one inlet port and a plurality of outlet ports. The plurality of outlet ports may have a smaller diameter than the inlet port. For example, the diameter of the plurality of outlet ports may be smaller than the diameter of the inlet port by a factor of at least 0.9, in particular by a factor of at least 0.8 or even by a factor of at least 0.7. Further, the at least one manifold may be installed in the at least one dispensing line. Thus, the at least one manifold may be configured for controlling the filling volume in the at least one dispensing line by reducing the diameter of the at least one dispensing line.

Further, the time-pressure-filling system may comprise at least one sterile filter. The at least one sterile filter may be comprised in one or both of the supply line and/or the dispensing line. The at least one sterile filter may be installed in close proximity to a point of fill. The term "sterile filter" as used herein is a broad term and is to be given its ordinary and customary meaning to a person of ordinary skill in the art and is not to be limited to a special or customized meaning. The term specifically may refer, without limitation, to a device which is configured for at least partially sterilizing a liquid by at least partially filtering microbial contaminations. Specifically, the sterile filter may be or may comprise a porous membrane. The porous membrane may have pores with a diameter or equivalent diameter of not more than 0.2 μm, specifically not more than 0.1 μm. Further, the sterile filter may sterilize the liquid by filtering the liquid passing through the sterile filter. Thus, the sterile filter may be configured for hindering impurities, such as bacteria, to pass the sterile filter.

The term "close proximity" as used herein is a broad term and is to be given its ordinary and customary meaning to a person of ordinary skill in the art and is not to be limited to a special or customized meaning. The term specifically may refer, without limitation, to a specification of a relative location. Specifically, the term "close proximity" may refer to a location of the at least one sterile filter installed close to a point of fill. For example, the location of the at least one sterile filter in close proximity to the point of fill may refer to an absolute distance of no more than 5 m, specifically no more than 2 m, more specifically no more than 1 m or even no more than 0.5 m, from the sterile filter to the point of fill. The absolute distance may be measured with regard to a distance the liquid drug product passes from the sterile filter to the point of fill. As another example, the location of the at least one sterile filter in close proximity to the point of fill may refer to a relative distance of no more than 10 percent, specifically no more than 5 percent, more specifically no more than 1 percent. The relative distance may be measured by comparing the absolute distance from the at least one sterile filter to the point of fill to a total distance the liquid drug product passes from the at least one storage vessel to the point of fill. Further, the specification of the location of the at least one sterile filter in close proximity to the point of fill may also refer to a comparison with a situation in which the sterile filter may be installed outside of at least one isolator, whereas in this case, the at least one sterile filter may be installed inside the at least one isolator.

The term "point of fill" as used herein is a broad term and is to be given its ordinary and customary meaning to a person of ordinary skill in the art and is not to be limited to a special or customized meaning. The term specifically may refer, without limitation, to a location where a liquid is dispensed into the containers. The dispensed liquid may be or may comprise the liquid drug product. Thus, the point of fill may be marked by the at least one dispenser dispensing the liquid drug product into containers.

Further, the components of the time-pressure-filling system may be connectable via couplings, specifically via plug-in couplings, more specifically via quick-release coupling. For example, the at least one supply line may be connected to the outlet of the storage vessel and to the inlet connecting branch of the surge vessel via quick-release couplings. Further, the at least one sterile filter comprised in one or both of the supply line and/or the dispensing line may be connectable via quick-release couplings. As another example, the at least one dispensing line may be connected to the outlet connecting branch of the surge vessel and to the at least one dispenser via quick-release couplings. Further, the at least one manifold in the at least one dispensing line may also be connectable via quick-release couplings. The at least one pressure sensor comprised by the time-pressure-filling system may also be connectable via quick-release couplings.

The time-pressure-filling system may further be surrounded by at least one isolator. The at least one isolator may provide a sterile surrounding for the time-pressure-filling system. Further, the isolator may comprise at least one sterile port, wherein the at least one sterile port may be configured for unidirectionally and/or bidirectionally exchanging components of the time-pressure-filling system in a sterile fashion. Thus, the time-pressure-filling system may be assembled inside the at least one isolator by means of couplings, specifically via plug-in couplings, more specifically via quick-release coupling.

The term "isolator" as used herein is a broad term and is to be given its ordinary and customary meaning to a person of ordinary skill in the art and is not to be limited to a special or customized meaning. The term specifically may refer, without limitation, to a microbially sealed container, such as a box, configured for enclosing a sterile surrounding. The container may be gas-tight and/or may be connected to the environment via one or more filter systems, such as one or more sterile filters. Thus, the isolator specifically may be a sterile isolator. As an example, the isolator may contain a glove box as typically used for providing small sterile environments and/or may comprise a sterile box or a sterile room. Specifically, the isolator may be configured for enclosing a sterile surrounding by keeping the interior of the isolator sealed from the exterior. Additionally or alternatively, the isolator may be or may comprise at least one restricted area barrier system (RABS), e.g., a system comprising at least one sterile box enclosing the sterile surrounding, wherein the restricted area barrier system may be located inside a sterile room. Further, the isolator may comprise at least one sterile port configured for making the isolator accessible in a sterile fashion. The term "sterile port" as used herein is a broad term and is to be given its ordinary and customary meaning to a person of ordinary skill in the art and is not to be limited to a special or customized meaning. The term specifically may refer, without limitation, to an arbitrary device configured for making an isolator accessible without affecting the sterile interior of the isolator. Specifically, the sterile port may be or may comprise a system of airlocks. For example, the sterile port may comprise at least two airlocks which can be opened and closed independent from each other. The two airlocks may be arranged in such a way that they may enclose an intermediate stage to the interior of the isolator. By opening a first, outer airlock and keeping the second, inner airlock closed, the intermediate stage may be accessible from the exterior of the isolator. By opening the second, inner airlock and keeping the outer airlock closed, the intermediate state may be accessible from the interior of the isolator. The at least two airlocks may further be configured for sealing the intermediate stage gas-tight from the interior and/or the exterior of the isolator. Further, the sterile port may be configured for sterilizing the intermediate stage, for example, by flushing the intermediate stage with a sterilizing gas, such a gaseous $H_2O_2$. Other options for arranging a sterile port are also feasible.

Further, the materials used for the time-pressure-filling system may be configured for being sterilized by means of at least one of radiation sterilization or gas sterilization, e.g., by gamma sterilization and/or sterilization by ethylene oxide. For example, the at least one rigid plastic material may be configured for being sterilized, specifically by means of gamma radiation. As another example, the at least one supply line, the at least one dispensing line and the at least one pressure control line comprised by reinforced silicone tubes, may be configured for being sterilized, specifically by means of gamma radiation.

Further, the control pressure applied to the surge vessel may be in the range of 50 to 1000 mbar, specifically 50 to 400 mbar.

The time-pressure-filling system according to this disclosure specifically may comprise the at least one surge vessel according to this disclosure, such as according to any one of the embodiments disclosed herein and/or as disclosed in further detail below. Thus, for optional embodiments of the surge vessel of the time-pressure filling system, reference may be made to the disclosure of the surge vessel given in further detail below.

The time-pressure-filling system may further comprise at least one control unit. The control unit may specifically be configured for at least one of: controlling a filling level of the surge vessel; controlling the control pressure applied to the surge vessel; controlling an opening time of the valve. The term "control unit" as used herein is a broad term and is to be given its ordinary and customary meaning to a person of ordinary skill in the art and is not to be limited to a special or customized meaning. The term specifically may refer, without limitation, to an electronic device configured, specifically by hardware and/or by software programming, for controlling the functionality of the time-pressure-filling system. Specifically, the control unit may be or may comprise a computer configured for receiving a signal, such as a signal from the at least one optical sensor and/or a signal from the at least one pressure sensor, and for further evaluating the received signal. For example, the control unit may be configured evaluating a signal from the at least one optical sensor for detecting a filling level of the surge vessel. As another example, the control unit may be configured for evaluating a signal from the at least one pressure sensor for determining a pressure in the at least one dispensing line. Further, the control unit may be configured for controlling the control pressure applied to the surge vessel and/or for controlling the pressure applied to the storage vessel for feeding the surge vessel with the liquid drug product. Thus, the control unit may be configured for controlling the filling level of the surge vessel in range of 30 percent to 60 percent. The control unit may further be configured for controlling the opening time of the valve. For example, the control unit may control the opening time of the valve in conjunction with the control pressure applied to the surge valve for controlling the filling volume of the liquid drug product into the containers.

In a further aspect of this disclosure, as indicated above, a surge vessel for use in a time-pressure-filling system is disclosed, such as for use in a time-pressure-filling system according to any one of the embodiments disclosed above and/or according to any one of the embodiments disclosed in further detail below. The surge vessel is configured for single use. The surge vessel is at least partially made of at least one rigid plastic material. The surge vessel comprises:
  a. a rigid cylindrical vessel sidewall;
  b. a rigid vessel bottom plate;
  c. a rigid vessel top plate;
  d. at least one supply pipe penetrating the rigid vessel bottom plate, wherein the supply pipe has at least one portion protruding into an interior space of the surge vessel and wherein the supply pipe further has at least one inlet connecting branch protruding from the vessel bottom plate outside the interior space for connecting a supply line to the supply pipe;
  e. at least one outlet connecting branch protruding from the vessel bottom plate outside the interior space for connecting at least one dispensing line; and
  f. at least one pressure control branch protruding from the vessel top plate outside the interior space for connecting at least one pressure control line.

The term "rigid cylindrical vessel sidewall" as used herein is a broad term and is to be given its ordinary and customary meaning to a person of ordinary skill in the art and is not to be limited to a special or customized meaning. The term specifically may refer, without limitation, to an arbitrary cylindrical enclosure of the surge vessel which is at least partially made of at least one rigid plastic material. Thus, the rigid cylindrical vessel sidewall may be at least partially transparent, specifically for light in the visible and/or infrared spectral range. The rigid cylindrical vessel sidewall may be configured for attaching at least one optical sensor to the outside of the rigid cylindrical vessel sidewall, wherein the optical sensor may be configured for detecting the filling level of the surge vessel. Further, the rigid cylindrical vessel sidewall may have a wall thickness of at least 0.5 mm, specifically of at least 1 mm, such as a thickness of 0.5 mm to 5 mm, e.g., a thickness of 1.0 mm to 3 mm. Further, the enclosure of the surge vessel may also have other shape than a cylindrical shape, such as a conical shape or a cubic shape. Other options are feasible.

The term "rigid vessel bottom plate" as used herein is a broad term and is to be given its ordinary and customary meaning to a person of ordinary skill in the art and is not to be limited to a special or customized meaning. The term specifically may refer, without limitation, to an arbitrary enclosure at the bottom end of the surge vessel which is at least partially made of at least one rigid plastic material. The rigid vessel bottom plate comprises the at least one outlet connecting branch. As an example, the rigid vessel bottom plate may also comprise a plurality of outlet connecting branches. The plurality of outlet connecting branches may have an equal or a different diameter to each other. The at least one outlet connecting branch is configured for connecting the at least one dispensing line to the surge vessel. Further, the rigid vessel bottom plate may have a shape corresponding the shape of the surge vessel. For example, if the surge vessel has a cylindrical shape, the rigid vessel bottom plate may have a circular shape. Other options are feasible. Further, the rigid vessel bottom plate comprises the at least one supply pipe, as will be outlined in further detail below.

The term "rigid vessel top plate" as used herein is a broad term and is to be given its ordinary and customary meaning to a person of ordinary skill in the art and is not to be limited to a special or customized meaning. The term specifically may refer, without limitation, to an arbitrary enclosure at the top end of the surge vessel which is at least partially made of at least one rigid plastic material. The rigid vessel top plate comprises the at least one pressure control branch, as will be outlined in further detail below. Further, the rigid vessel top plate may have a shape corresponding the shape of the surge vessel. For example, if the surge vessel may have a cylindrical shape, the rigid vessel top plate may have a circular shape. Other options are feasible.

The term "supply pipe" as used herein is a broad term and is to be given its ordinary and customary meaning to a person of ordinary skill in the art and is not to be limited to a special or customized meaning. The term specifically may refer, without limitation, to an arbitrary device configured for connecting the at least one supply line to the interior space of the surge vessel. For this purpose, the supply pipe is penetrating the rigid vessel bottom plate and has further at least one portion protruding into the interior space of the surge vessel and at least one inlet connecting branch protruding from the rigid vessel bottom plate outside the interior space for connecting the supply line to the supply pipe. The at least one portion of the supply pipe may protrude into the interior space of the surge vessel up to half the height of the surge vessel. Thus, the at least one portion of the supply pipe protruding into the interior space of the surge vessel may be configured for enabling a soft and turbulence-free inflow of the incoming liquid. Further, the supply pipe may be at least partially made of at least one rigid plastic material.

The term "interior space of the surge vessel" as used herein is a broad term and is to be given its ordinary and customary meaning to a person of ordinary skill in the art and is not to be limited to a special or customized meaning. The term specifically may refer, without limitation, to a space enclosed by the rigid cylindrical vessel sidewall, the rigid vessel bottom plate and the rigid vessel top plate. Specifically, the interior space of the surge vessel may contain the liquid stored inside the surge vessel. Further, the at least one control pressure may be applied to the interior space of the surge vessel and, thus, to the liquid stored inside the surge vessel. The interior space of the surge vessel specifically may comprise a volume of at least 0.5 l, such as a volume of 1 l to 50 l, e.g., a volume of 1 l to 10 l, such as a volume of 7 to 8 l.

The term "inlet connecting branch" as used herein is a broad term and is to be given its ordinary and customary meaning to a person of ordinary skill in the art and is not to be limited to a special or customized meaning. The term specifically may refer, without limitation, to a device which is configured for fluidically coupling the at least one supply line to the at least one supply pipe. In this context, the term "fluidically coupled" may refer to a way of connecting a first device and a second device such that an arbitrary liquid may be movable or transferable from the first device to the second device and/or vice versa. Further, the at least one inlet connecting branch protrudes from the rigid vessel bottom plate outside the interior space of the surge vessel.

The term "outlet connecting branch" as used herein is a broad term and is to be given its ordinary and customary meaning to a person of ordinary skill in the art and is not to be limited to a special or customized meaning. The term specifically may refer, without limitation, to a device which is configured for fluidically coupling the surge vessel to the at least one dispensing line. As an example, the at least one outlet connecting branch may be at least partially made of at least one rigid plastic material. As another example, the at least one outlet connecting branch may also be at least partially made of a metal or an alloy of metals, such as stainless steel. Further, the at least one outlet connecting branch protrudes from the rigid vessel bottom plate outside the interior space of the surge vessel. As an example, the surge vessel may comprise a plurality of outlet connecting branches protruding from the rigid vessel bottom plate outside the interior space. The plurality of the outlet connecting branches may have an equal or a different diameter to each other. The at least one dispensing line connected to the outlet connecting branch may have a similar diameter to the outlet connecting branch. Thus, a plurality of dispensing lines each one connected to at least one outlet connecting branch may have an equal or a different diameter to each other.

The term "pressure control branch" as used herein is a broad term and is to be given its ordinary and customary meaning to a person of ordinary skill in the art and is not to be limited to a special or customized meaning. The term specifically may refer, without limitation, to a device which is configured for connecting the at least one pressure control line to the surge vessel. The pressure control branch may be configured for connecting the pressure control line in such a way that the control pressure may be applied to the interior space of the surge vessel. Specifically, the pressure control branch may protrude from the rigid vessel top plate outside the interior space.

As outlined above, the surge vessel is at least partially made of at least one rigid plastic material. The at least one rigid plastic material may comprise at least one material selected from the group consisting of: polypropylene; polyethylene; polycarbonate. Further, the at least one rigid plastic material may be at least partially transparent, specifically for light in the visible and/or infrared spectral range. The term "transparent" as used herein is a broad term and is to be given its ordinary and customary meaning to a person of ordinary skill in the art and is not to be limited to a special or customized meaning. The term specifically may refer, without limitation, to an optical characteristic referring to the ability of at least partially transmitting light in the visible and/or infrared spectral range. Specifically, the at least one transparent rigid plastic material may show a transmission of light in the visible and/or infrared spectral range of at least 0.7, preferably at least 0.8 or even at least 0.9. Further, the at least one rigid plastic material may transmit light at at least one wavelength in the visible and/or infrared spectral range. As another example, the transparent rigid plastic material may also transmit light in a wavelength interval in the visible and/or infrared spectral range.

The surge vessel may further comprise at least one optical sensor. The at least one optical sensor may be disposed outside the interior space of the surge vessel. Specifically, the at least one optical sensor may be attached to the outside of the rigid cylindrical vessel sidewall, such as by using at least one connecting element. Further, the at least one optical sensor specifically may be sensitive in at least one of the visible and/or the infrared spectral range. The term "optical sensor" as used herein is a broad term and is to be given its ordinary and customary meaning to a person of ordinary skill in the art and is not to be limited to a special or customized meaning. The term specifically may refer, without limitation, to an electronic device which is configured for detecting light in the visible and/or infrared spectral range. Specifically, the optical sensor may be sensitive to incoming light and may generate an electronic signal corresponding to an intensity of the incoming light. The electronic signal generated by the at least one optical sensor may be evaluated by the at least one control unit for detecting a filling level of the surge vessel. Alternatively and/or additionally, the optical sensor may be configured for detecting the filling level of the surge vessel. Further, the optical sensor may be sensitive to at least one specific wavelength of light in the visible and/or infrared spectral range. Further, the optical sensor may also be sensitive to an interval of wavelength in the visible and/or infrared spectral range.

The term "visible spectral range" as used herein is a broad term and is to be given its ordinary and customary meaning to a person of ordinary skill in the art and is not to be limited to a special or customized meaning. The term specifically may refer, without limitation, to a wavelength interval of visible light. Specifically, the visible spectral range may refer to visible light having a wavelength of 380 nm to 760 nm. Consequently, the term "infrared spectral range" as used herein is a broad term and is to be given its ordinary and customary meaning to a person of ordinary skill in the art and is not to be limited to a special or customized meaning. The term specifically may refer, without limitation, to a wavelength interval of infrared light. Specifically, the infrared spectral range may refer to infrared light having a wavelength of 760 nm to 1 mm.

Further, the at least one optical sensor may be configured for detecting a filling level of the surge vessel. Specifically, the surge vessel and/or the time-pressure-filling system may comprise the at least one control unit, wherein the control unit may be configured for detecting a filling level by evaluating at least one signal generated by the optical sensor.

The rigid cylindrical sidewall of the surge vessel may have a wall thickness of at least 1 mm. Thus, the surge vessel may be pressure-stable in the above-identified pressure range. The surge vessel may further comprise a plurality of outlet connecting branches. The plurality of outlet connecting branches may have at least two diameters, wherein the at least two diameters may be equal or different to each other. Thus, the time-pressure-filling system comprising the surge vessel may be configured for filling a plurality of containers. The plurality of containers may be filled by using at least one manifold in at least one dispensing line. As another example, the plurality of containers may be filled by using a plurality of dispensing lines connected to the plurality of outlet connecting branches. The time-pressure-filling system may further be configured for filling different sizes of containers by using the plurality of dispensing lines connected to the plurality of outlet connecting branches having a different diameter.

In a further aspect of this disclosure, a time-pressure-filling method for filling at least one liquid drug product into containers is disclosed. The time-pressure-filling method comprises the following steps which specifically may be performed in the given order. It shall be noted, however, that a different order is also possible. Further, it is also possible to perform one or more of the method steps once or repeatedly. Further, it is possible to perform one or more of the method steps simultaneously or in a timely overlapping fashion. The method may comprise further method steps which are not listed.

The time-pressure-filling method comprises:
i. providing the time-pressure-filling system according to this disclosure, such as according to any one of the embodiments disclosed above and/or according to any one of the embodiments disclosed in further detail below referring to a time-pressure-filling system, specifically comprising at least one surge vessel according to this disclosure, such as according to any one of the embodiments disclosed above and/or according to any one of the embodiments disclosed in further detail below referring to a surge vessel;
ii. feeding the liquid drug product from the storage vessel into the surge vessel in a pressurized fashion;
iii. controlling the pressure in the surge vessel by applying a control pressure to the surge vessel;
iv. determining the pressure in the dispensing line by using the pressure sensor; and
v. dispensing predetermined amounts of the liquid drug product into the containers by controlling an opening time of the valve.

The term "feeding the liquid drug product" as used herein is a broad term and is to be given its ordinary and customary meaning to a person of ordinary skill in the art and is not to be limited to a special or customized meaning. The term specifically may refer, without limitation, to a supply of the liquid drug product and/or a transfer of the liquid drug product from the storage vessel into the surge vessel by applying a pressure to the storage vessel.

The term "controlling the pressure in the surge vessel" as used herein is a broad term and is to be given its ordinary and customary meaning to a person of ordinary skill in the art and is not to be limited to a special or customized meaning. The term specifically may refer, without limitation, to one or more of assessing, verifying, maintaining or setting the pressure in the surge vessel. Specifically, the pressure in the surge vessel may be set by applying the control pressure to the surge vessel. The pressure applied thereto may be verified by determining the pressure in the dispensing line by using the pressure sensor, as will be described in further detail below. Further, controlling the pressure in the surge vessel may also involve a regulation of the applied control pressure after determining the pressure in the dispensing line. Thus, step iii. and step iv. may be subsequently repeated until a predetermined pressure value in the dispensing line is realized.

The term "determining the pressure" as used herein is a broad term and is to be given its ordinary and customary meaning to a person of ordinary skill in the art and is not to be limited to a special or customized meaning. The term specifically may refer, without limitation, to a qualitatively and/or quantitatively assessment of a pressure in a liquid. Specifically, the term may refer to a qualitatively and/or quantitatively assessment of the pressure of the liquid drug product in the dispensing line. Thus, the determination of the pressure may involve using at least one pressure sensor. For example, the at least one pressure sensor may be arranged in the at least one dispensing line in order to determine the pressure of the liquid drug product in the at least one dispensing line. The result of the determination of the pressure may be or may comprise at least one numerical value indicating the pressure of the liquid drug product in the at least one dispensing line.

The term "dispensing predetermined amounts of the liquid drug product into the containers" as used herein is a broad term and is to be given its ordinary and customary meaning to a person of ordinary skill in the art and is not to be limited to a special or customized meaning. The term specifically may refer, without limitation, to a controlled release of the liquid drug product via the at least one dispenser into the containers. Specifically, the amount of liquid drug product dispensed into the containers may be controlled with regard to a predefined filling volume. For example, the predefined filling volume may depend on the containers to be filled and may be in the range of 100 µl to 100 ml. The filling volume dispensed into the containers may depend on the control pressure applied to the surge vessel and the opening time of the valve. Thus, by controlling the opening time of the at least one valve in the at least one dispensing line in combination with the control pressure applied to the surge vessel, the volume dispensed into the containers may be controlled.

The time-pressure-filling system may further comprise at least one control unit, wherein the control unit may be configured for at least one of: controlling the filling level of the surge vessel; controlling the control pressure applied to the surge vessel; controlling the opening time of the valve. The control unit may further be configured for controlling the opening time of the valve to at least one time value in a range of 1 to 2000 ms, specifically of 1 to 400 ms. Further, the control unit may be configured for controlling the filling level of the surge vessel to at least one level value in a range of 30 percent to 60 percent of a maximum filling capacity of the surge vessel.

The time pressure-filling method may further comprise filling a batch of the liquid drug product into containers. A batch of the liquid drug product may be defined by a predetermined amount of the liquid drug product, wherein the method may comprise exchanging the surge vessel after filling the batch of the liquid drug product into the containers and disposing of the surge vessel. Further, the time-pressure-filling system may comprise a plurality of the surge vessels, wherein the surge vessels may be used subsequently one after the other for different batches, wherein used surge vessels may be disposed of.

In a further aspect of this disclosure, a use of at least one of the time-pressure-filling system and the surge vessel is disclosed. The at least one time-pressure-filling system and the at least one surge vessel are used for filling at least one of the following liquid drug product into containers: a pharmaceutical product; a steroid product; a liquid drug product for subcutaneous application; a liquid drug product for intravenous application; a high-potent liquid drug product; an aqueous protein solution, such as an antibody drug product solution.

A pressure-stable surge vessel may be realized by using the at least one rigid plastic material, for example, polypropylene and/or polyethylene, to construct the surge vessel, wherein the rigid vessel sidewall may have a thickness of at least 1 mm. The rigid plastic material may be transparent and, thus, may allow for determining the filling level of the surge vessel by using the at least one optical sensor. The determination of the filling level may avoid overfilling of the surge vessel. Further, a filling level in the range of 25% to 75%, specifically 30% to 60%, may ensure a sufficient dwell time of the liquid, for example, of the liquid drug product, in the surge vessel. During the dwell time, the liquid, such as the liquid drug product, may outgas the gas which is absorbed when pressure is applied to the liquid, for example, the pressure applied to the liquid in the storage vessel. The outgassing of the liquid may enhance the filling accuracy of the time-pressure-filling system.

The surge vessel may further be in a cylindrical shape to ensure a homogeneous pressure distribution in the interior space of the surge vessel. The supply line may have at least one portion protruding the rigid vessel bottom plate configured for enabling a soft and turbulence-free inflow of the incoming liquid, such as the liquid drug product.

The liquid, such as the liquid drug product, may be transported to the storage vessel and/or out of the storage vessel through platinum reinforced silicone tubes which may be connected to the at least one inlet connecting branch and/or the at least one outlet connecting branch. Specifically, braid reinforced silicone tubes may be used to prevent pressure loss in one or more of the supply line or the dispensing line.

Further, the number and/or the diameter of the at least one connecting branch may be adjusted to the number and/or the diameter of the at least one dispensing line as well as to the predetermined filling volume of the liquid, such as the liquid drug product. The predetermined filling volume and/or the filling speed may be dependent on the container to be filled with the liquid, such as the liquid drug product. The predetermined filling volume may be in a range of 100 µl to 100 ml.

Further, the time-pressure-filling system may comprise the at least one manifold, at least one choke and/or at least one adapter configured for reducing the tube's diameter for enhancing the filling accuracy of the liquid, such as the liquid drug product.

The control pressure may be applied via the pressure control line to the pressure control branch at the rigid vessel top plate. The applied pressure may be determined in the at least one dispensing line using the at least one pressure sensor. The pressure sensor may be integrated into the at least one dispensing line and may also be configured for single use. The control unit may control the applied pressure within predetermined pressure limits.

As outlined above, the time-pressure-filling system may be fully or partially enclosed by the at least one isolator. The components of the time-pressure-filling system may be sterilized, such as by using at least one of gamma radiation and/or gaseous ethylene oxide, and may be transferred into the isolator via the sterile port. The assembly of the components of the time-pressure-filling system may take place inside the isolator via couplings, such as quick-release couplings.

The methods and devices according to this disclosure provide a large number of advantages over similar methods and devices known in the art. Specifically, the methods and devices according to this disclosure may allow using the time-pressure-filling systems for a wide range of different liquid drug products, specifically for multi-product-filling lines. The time-pressure-filling system, specifically the surge vessel, may be configured for single use and, thus, may be disposed of after filling a batch of the liquid drug product. Therefore, by using the time-pressure-filling system, specifically the surge vessel according to this disclosure, the need for extensive cleaning of the time-pressure-filling system may become obsolete. Thus, the methods and devices according to this disclosure may allow for filling a wide range of many different liquid drug products using the same time-pressure-filling system while enabling the highest possible level of patient security and further avoiding possible cross contaminations.

Further, the assembly of the time-pressure-filling system inside the at least one isolator may provide an easy handling to the worker as well as further compliance and product stability advantages. Thus, the sterile filtration may take place in close proximity to the point of fill and is, thus, in accordance with regulations and safety guidelines. Further, the sterile filter may be installed inside the at least one isolator and, thus, an $H_2O_2$ absorption into the liquid drug product by the decontamination process may be avoided. This may enhance additionally the product safety.

An integration of the time-pressure-filling system and/or of the surge vessel as proposed herein may also take place into an existing or established time-pressure-filling system so far made of stainless steel. The automation of the existing filling system may be used without further adjustments. Only minor mechanical and electrical adjustments may be necessary. These adjustments may refer to an extension of the pressure supply to the surge vessel configured for single use and a determination of the pressure in the dispensing line by using the pressure sensor configured for single use.

Summarizing and without excluding further possible embodiments, the following embodiments may be envisaged:

Embodiment 1: A time-pressure-filling system for filling at least one liquid drug product into containers, comprising:
- A. at least one storage vessel for storing the liquid drug product;
- B. at least one surge vessel, wherein the surge vessel is configured for single use, wherein the surge vessel is at least partially made of at least one rigid plastic material;
- C. at least one supply line for feeding the liquid drug product from the storage vessel into the surge vessel in a pressurized fashion;
- D. at least one pressure control line for applying a control pressure to the surge vessel;
- E. at least one dispenser for dispensing the liquid drug product into the containers;
- F. at least one dispensing line connecting the surge vessel to the dispenser;
- G. at least one pressure sensor for determining a pressure in the dispensing line; and
- H. at least one valve for controlling a flow of the liquid drug product through the dispensing line.

Embodiment 2: The time-pressure-filling system according to the preceding embodiment, wherein the at least one storage vessel and the at least one surge vessel are pressure-stable vessels.

Embodiment 3: The time-pressure-filling system according to any one of the preceding embodiments, wherein the at least one supply line, the at least one pressure control line and the at least one dispensing line comprise pressure-stable tubes.

Embodiment 4: The time-pressure-filling system according to the preceding embodiment, wherein the pressure-stable tubes comprise reinforced silicone tubes, specifically braid reinforced silicone tubes, more specifically platinum reinforced silicone tubes.

Embodiment 5: The time-pressure-filling system according to any one of the three preceding embodiments, wherein the components of the time-pressure-filling system are pressure-stable in a pressure range of 50 to 5000 mbar, specifically 50 to 3000 mbar more specifically 50 to 1000 mbar.

Embodiment 6: The time-pressure-filling system according to any one of the preceding embodiments, wherein the pressure sensor is arranged in the at least one dispensing line.

Embodiment 7: The time-pressure-filling system according to any one of the preceding embodiments, wherein the time-pressure-filling system comprises at least one manifold, specifically at least one manifold for single use, wherein the manifold provides one inlet port and a plurality of outlet ports.

Embodiment 8: The time-pressure-filling system according to the preceding embodiment, wherein the plurality of outlet ports of the manifold have a smaller diameter than the inlet port.

Embodiment 9: The time-pressure-filling system according to any one of the two preceding embodiments, wherein the at least one manifold is installed in the at least one dispensing line.

Embodiment 10: The time-pressure-filling system according to any one of the preceding embodiments, wherein the time-pressure-filling system comprises at least one sterile filter, specifically in one or both of the supply line and the dispensing line.

Embodiment 11: The time-pressure-filling system according to the preceding embodiment, wherein the sterile filter is installed in close proximity to a point of fill.

Embodiment 12: The time-pressure-filling system according to any one of the preceding embodiments, wherein the components of the time-pressure-filling system are connectable via couplings, specifically via plug-in couplings, more specifically via quick-release couplings.

Embodiment 13: The time-pressure-filling system according to any one of the preceding embodiments, wherein the time-pressure-filling system is surrounded by at least one isolator, such as a box isolator and/or a restricted area barrier system, wherein the isolator provides a sterile surrounding for the time-pressure-filling system.

Embodiment 14: The time-pressure-filling system according to the preceding embodiment, wherein the isolator comprises at least one sterile port, wherein the sterile port is configured for unidirectionally or bidirectionally exchanging components of the time-pressure-filling system in a sterile fashion.

Embodiment 15: The time-pressure-filling system according to any one of the preceding embodiments, wherein the materials used for the time-pressure-filling system are configured for being sterilized by means of radiation, specifically by gamma radiation.

Embodiment 16: The time-pressure-filling system according to any one of the preceding embodiments, wherein the control pressure applied to the surge vessel is in the range of 50 to 1000 mbar, specifically 50 to 400 mbar.

Embodiment 17: The time-pressure-filling system according to any one of the preceding embodiments, wherein the time-pressure-filling system comprises at least one surge vessel according to any one of the following embodiments referring to a surge vessel.

Embodiment 18: The time-pressure-filling system according to any one of the preceding embodiments, wherein the time-pressure-filling system further comprises at least one control unit, wherein the control unit specifically is configured for at least one of: controlling a filling level of the surge vessel; controlling the control pressure applied to the surge vessel; controlling an opening time of the valve.

Embodiment 19: A surge vessel for use in a time-pressure-filling system, specifically for use in a time-pressure-filling system according to any one of the preceding embodiments, wherein the surge vessel is configured for single use, wherein the surge vessel is at least partially made of at least one rigid plastic material, the surge vessel comprising:
  a. a rigid cylindrical vessel sidewall;
  b. a rigid vessel bottom plate;
  c. a rigid vessel top plate;
  d. at least one supply pipe penetrating the rigid vessel bottom plate, wherein the supply pipe has at least one portion protruding into an interior space of the surge vessel and wherein the supply pipe further has at least one inlet connecting branch protruding from the vessel bottom plate outside the interior space for connecting a supply line to the supply pipe;
  e. at least one outlet connecting branch protruding from the vessel bottom plate outside the interior space for connecting at least one dispensing line; and
  f. at least one pressure control branch protruding from the vessel top plate outside the interior space for connecting at least one pressure control line.

Embodiment 20: The surge vessel according to the preceding embodiment, wherein the at least one rigid plastic material comprises at least one material selected from the group consisting of: polypropylene; polyethylene; polycarbonate.

Embodiment 21: The surge vessel according to any one of the preceding embodiments referring to a surge vessel, wherein the rigid plastic material is at least partially transparent, specifically for light in the visible and/or infrared spectral range.

Embodiment 22: The surge vessel according to the preceding embodiment, wherein the surge vessel comprises at least one optical sensor, wherein the at least one optical sensor is disposed outside the interior space, specifically wherein the optical sensor is attached to the outside of the rigid cylindrical vessel sidewall, and wherein the optical sensor specifically is sensitive in at least one of the visible and the infrared spectral range.

Embodiment 23: The surge vessel according to the preceding embodiment, wherein the at least one optical sensor is configured for detecting a filling level of the surge vessel specifically, the surge vessel and/or the time-pressure-filling system may comprise at least one control unit, wherein the control unit is configured for detecting a filling level by evaluating at least one signal generated by the optical sensor.

Embodiment 24: The surge vessel according to any one of the preceding embodiments, wherein the rigid cylindrical sidewall has a wall thickness of at least 1 mm.

Embodiment 25: The surge vessel according to any one of the preceding embodiments, wherein the surge vessel comprises a plurality of outlet connecting branches.

Embodiment 26: The surge vessel according to the preceding embodiment, wherein the plurality of outlet connecting branches has at least two diameters, wherein the at least two diameters are equal or different to each other.

Embodiment 27: A time-pressure-filling method for filling at least one liquid drug product into containers, comprising:

i. providing the time-pressure-filling system according to any one of the preceding embodiments referring to a time-pressure-filling system, specifically comprising at least one surge vessel according to any one of the preceding embodiments referring to a surge vessel;
 ii. feeding the liquid drug product from the storage vessel into the surge vessel in a pressurized fashion;
 iii. controlling the pressure in the surge vessel by applying a control pressure to the surge vessel;
 iv. determining the pressure in the dispensing line by using the pressure sensor; and
 v. dispensing predetermined amounts of the liquid drug product into the containers by controlling an opening time of the valve.

Embodiment 28: The method according to the preceding embodiment, wherein the time-pressure-filling system comprises further at least one control unit, wherein the control unit is configured for at least one of: controlling the filling level of the surge vessel; controlling the control pressure applied to the surge vessel; controlling the opening time of the valve.

Embodiment 29: The method according to the preceding embodiment, wherein the control unit is configured for controlling the opening time of the valve to at least one time value in a range of 1 to 2000 ms, specifically of 1 to 400 ms.

Embodiment 30: The method according to any one of the two preceding embodiments, wherein the control unit is configured for controlling the filling level of the surge vessel to at least one level value in a range of 30 percent to 60 percent of a maximum filling capacity of the surge vessel.

Embodiment 31: The method according to any one of the preceding method embodiments, wherein a batch of the liquid drug product is defined by a predetermined amount of the liquid drug product, wherein the method comprises exchanging the surge vessel after filling the bench batch of the liquid drug product into the containers and disposing of the surge vessel.

Embodiment 32: The method according to the preceding embodiment, wherein the time-pressure-filling system comprises a plurality of the search surge vessels, wherein the search surge vessels are used subsequently one after the other for different batches, wherein used surge vessels are disposed of.

Embodiment 33: A use of at least one of the time-pressure-filling system according to any one of the preceding embodiments referring to a time-pressure-filling system and the surge vessel according to any one of the preceding embodiments referring to a surge vessel, for filling at least one of the following liquid drug product into containers: a pharmaceutical product; a steroid product; a liquid drug product for subcutaneous application; a liquid drug product for intravenous application; a high-potent liquid drug product; an aqueous protein solution, such as at least one antibody drug product solution.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
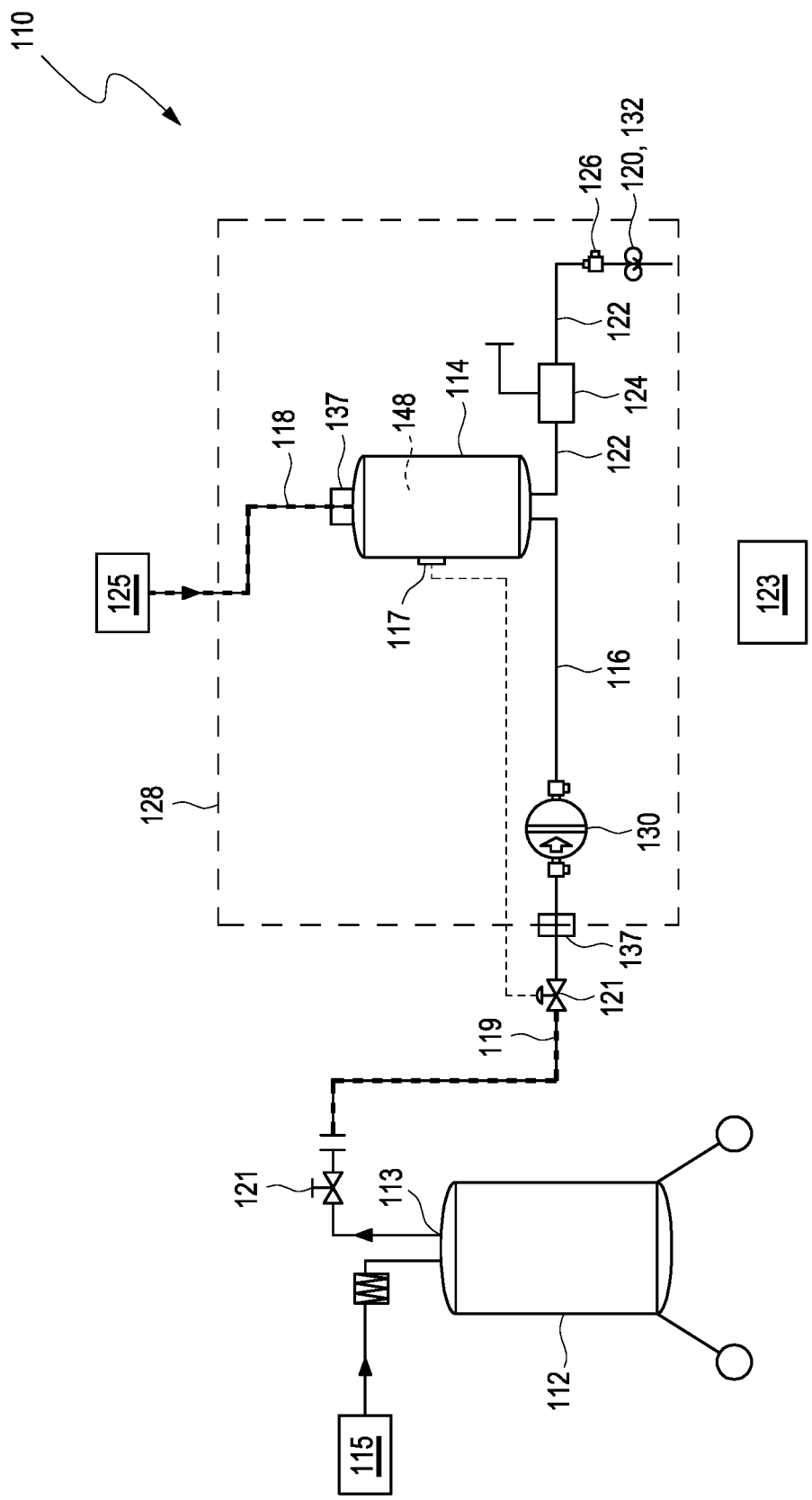
FIG. 1 shows an embodiment of a time-pressure-filling system for filling at least one liquid drug product into containers in a schematic view.

In FIG. 1, an exemplary embodiment of a time-pressure-filling system 110 for filling at least one liquid drug product into containers 111 is shown in a schematic view. The containers 111 are not depicted in FIG. 1. In this regard, reference may be made to FIG. 3 as will be explained in further detail below.

The time-pressure-filling system 110 comprises at least one storage vessel 112. The storage vessel 112 is configured for storing the liquid drug product. The storage vessel 112 may comprise at least one outlet 113. Further, the storage vessel 112 may be connected to at least one pressure supply 115.

The time pressure-filling system 110 further comprises at least one surge vessel 114. The surge vessel 114 may be connected to the storage vessel 112 via at least one supply line 116 and, optionally, one or more connecting lines 119 and/or one or more valves 121, connecting the supply line 116 to the outlet 113 and, thereby, fluidically connecting the surge vessel 114 to the storage vessel 112. The supply line 116 is configured for feeding the liquid drug product from the storage vessel 112 into the surge vessel 114 in a pressurized fashion.

Further, the time pressure-filling system 110, specifically the surge vessel 114, may comprise at least one optical sensor 117, wherein the optical sensor 117 may be disposed outside an interior space 148 of the surge vessel 114. For example, the optical sensor 117 may be attached to the outside of the surge vessel 114. The optical sensor 117 may be configured for detecting the filling level of the surge vessel 114. For controlling the filling of the surge vessel 114, one or more of the optional valves 121 may directly be connected to the optical sensor 117. Alternatively, the at least one valve 121 may also be controlled by at least one control unit 123 of the time pressure-filling system 110, which may receive one or more sensor signals of the at least one optical sensor 117.

The surge vessel 114 specifically may be embodied as a disposable component. Specifically, the surge vessel 114 is at least partially made of at least one rigid plastic material. An exemplary embodiment of the surge vessel 114 is shown in FIG. 2*a-e* and will be described in further detail below.

The time-pressure-filling system 110 further comprises at least one pressure control line 118. The pressure control line 118 is configured for applying a control pressure to the surge vessel 114. For this purpose, the pressure control line 118 may be connected to at least one further pressure supply 125, such as one or more of a pump, a pressure supply line and/or a pressure controller. The pressure specifically may be applied in a controlled fashion. The control pressure applied to the surge vessel 114, in conjunction with an opening time of a dispensing or filling valve, such as valve 126 as disclosed in further detail below, may determine the filling volume of the liquid drug product.

The time-pressure-filling system 110 further comprises at least one dispenser 120 for dispensing the liquid drug product into the containers. Further, the time-pressure-filling system 110 comprises at least one dispensing line 122. The dispensing line 122 is configured for connecting the surge vessel 114 to the dispenser 120. As an example, the at least one dispenser 120 may be or may comprise at least one needle or a nozzle, as will be outlined in further detail below, with respect to FIG. 3.

For determining a pressure in the dispensing line 122, the time-pressure-filling system 110 comprises at least one pressure sensor 124. The pressure sensor 124 may fully or partially be arranged in the at least one dispensing line 122. However, additionally or alternatively, the at least one pressure sensor 124 may also be arranged, for example, in one or more of a bypass of the dispensing line 122, a branch of the dispensing line 122 or a parallel line of the dispensing line 122.

Further, the time-pressure-filling system 110 comprises at least one valve 126, also referred to as a dispensing valve or dosing valve. The valve 126 is configured for controlling a flow of the liquid drug product through the dispensing line 122 or a part thereof. The at least one valve 126 may be or may comprise a squeeze valve. The valve 126 specifically may be a controllable valve, such as an electronically controllable valve and/or a computer-controllable valve. Thus, as an example, the opening time of the valve 126 may be controlled by the control unit 123.

The time-pressure-filling system 110 may further fully or partially be surrounded by at least one isolator 128, such as a glove box and/or a sterile container. The at least one isolator 128 may be configured for providing a sterile surrounding to the time-pressure-filling system 110 or a part thereof. Specifically, one or more or even all of the following components of the time-pressure-filling system 110 may be arranged, fully or partially, within the sterile surrounding provided by the isolator 128: the surge vessel 114, the dispenser 120, the dispensing line 122, the valve 126, the pressure sensor 124, the supply line 116, at least one sterile filter 130 as further disclosed below, a manifold 134 as further disclosed below. Other components may be located outside the sterile surrounding provided by the isolator 128, such as one or more or even all of the following components: the storage vessel 112 with the at least one outlet 113, the pressure supply 115 and/or 125, the valve 121, the connecting line 119.

Figure 3:
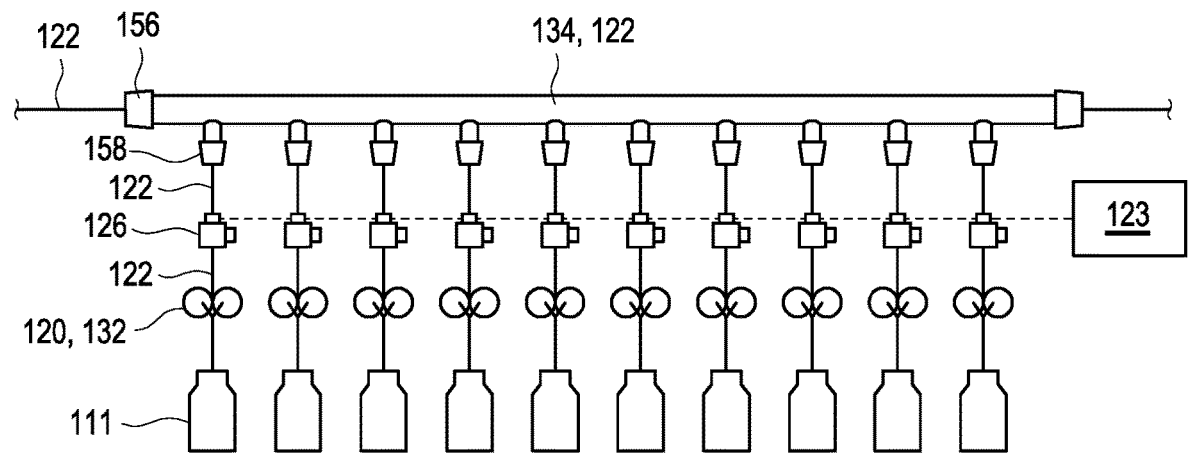
FIG. 3 shows an embodiment of a manifold in a schematic view.

Further, the time-pressure-filling system 110 may comprise at least one sterile filter 130, specifically inside the at least one isolator 128. The sterile filter 130 may be comprised in one or both of the supply line 116 or the dispensing line 122. Thus, the sterile filter 130 may be installed in close proximity to a point of fill 132 of the dispenser 120. The sterile filter 130 may be configured for one or both of filtering or sterilizing the liquid drug product. Further, the time-pressure-filling system 110 may further comprise at least one manifold 134 which is not depicted in FIG. 1. An exemplary embodiment of the manifold 134 is shown in FIG. 3 and will be described in further detail below.

As indicated above, the time-pressure-filling system 110 specifically may fully or partially be embodied as a disposable system. Thus, a plurality of components of the time-pressure-filling system 110 may be made of one or more plastic materials, such as one or more or even all of the following components: the surge vessel 114, the dispenser 120, the dispensing line 122, the valve 126, the pressure sensor 124, the supply line 116, the sterile filter 130 as further disclosed below, the manifold 134 as further disclosed below. Other components, however, may be embodied as reusable components, such as components fully or partially made of one or more metallic materials, e.g., stainless steel. Thus, as an example, one or more or even all of the following components may be made of at least one metallic material, such as stainless steel: the storage vessel 112 with the at least one outlet 113, the pressure supply 115 and/or 125, the pressure control line 118, the valve 121, the connecting line 119. As shown in FIG. 1, most of the metallic components, besides the pressure control line 118, specifically may be located outside the isolator 128, whereas most of the disposable plastic components may be located inside the isolator 128. Specifically, the time-pressure-filling system 110 may comprise one or more interfaces 137 for establishing releasable connections between reusable parts and disposable parts of the time-pressure-filling system 110. As an example, at least one interface may be located in between one or more of the connecting line 119, the outlet 113 or the valve 121 and the supply line 116. Further, at least one interface 137 may also be located in between the pressure control line 118 and the surge vessel 114. The interfaces, specifically, may comprise at least one quick-release coupling. Thereby, the disposable components of the time-pressure-filling system 110 may quickly be removed and replaced by new components.

Figure 2:
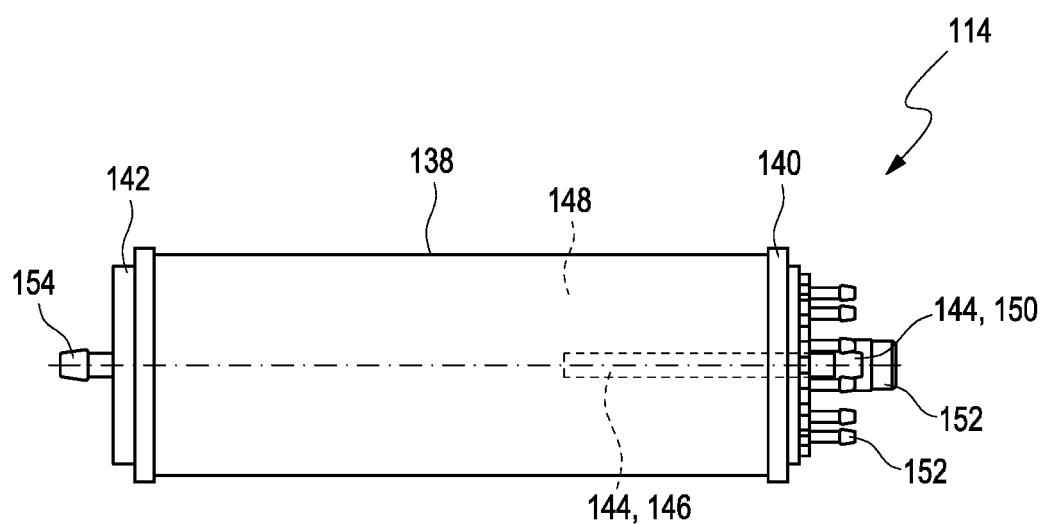
FIGS. 2*a-e* show an embodiment of a surge vessel in a cross-sectional and in a perspective view.
Figure 2:
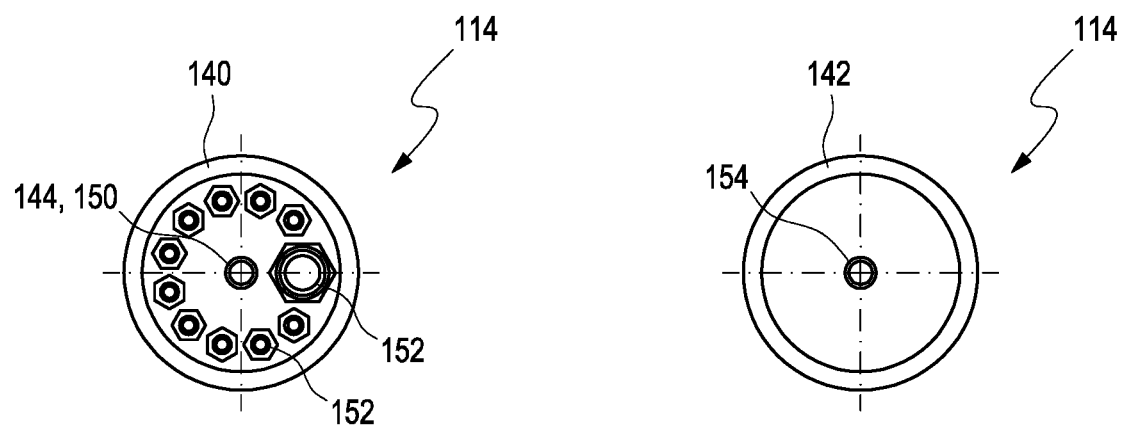
Figure 2:
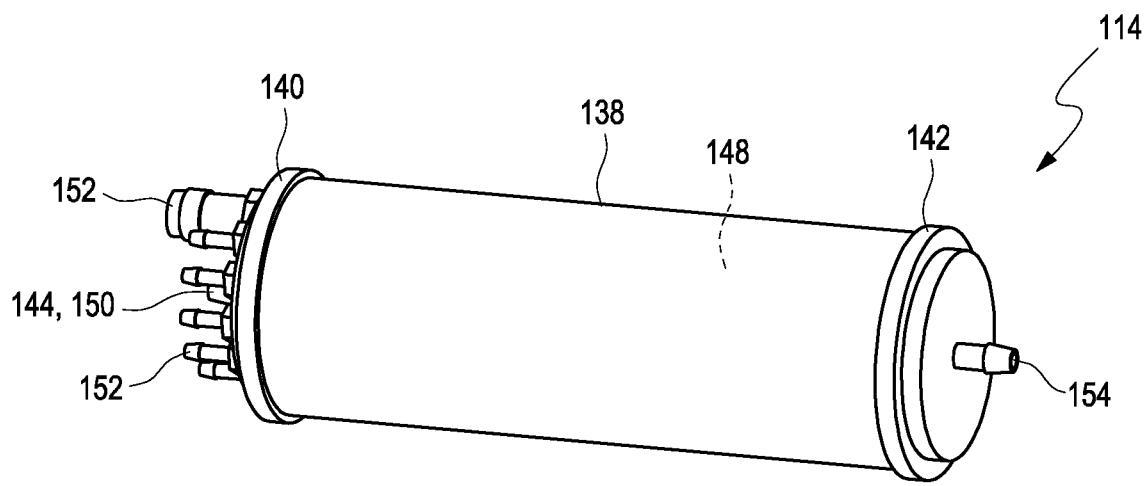
Figure 2:
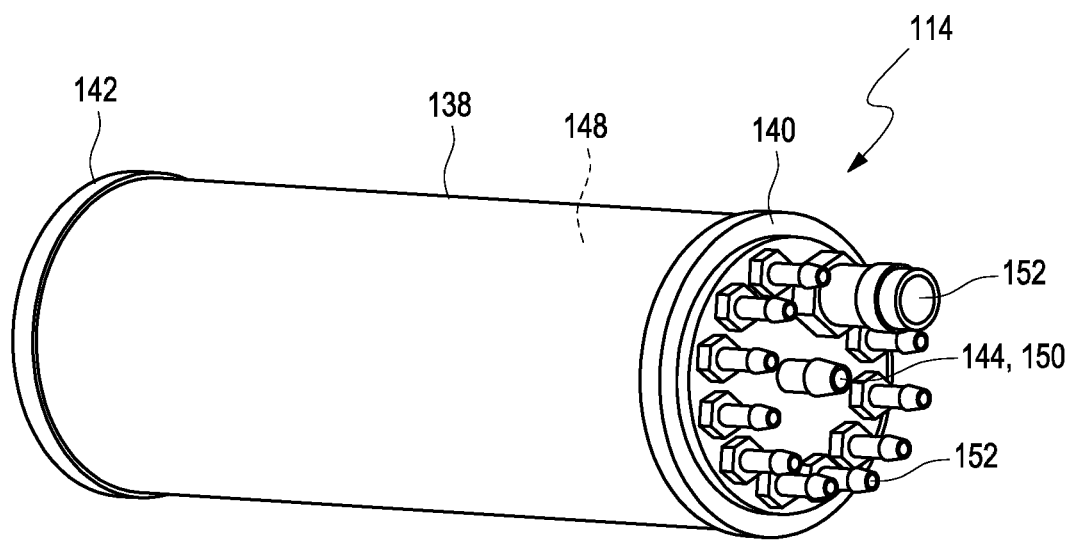

In FIGS. 2a-e an exemplary embodiment of the surge vessel 114 is shown in various views. Therein, FIG. 2a shows a cross-sectional view, FIG. 2b shows a bottom view in the arrangement of FIG. 1, FIG. 2c shows a top view in the arrangement of FIG. 1, and FIGS. 2d and 2e show different perspective views of the surge vessel 114.

The surge vessel 114 is at least partially made of at least one rigid plastic material and, thus, specifically may be configured for single use. The surge vessel 114 comprises a rigid vessel sidewall 138, a rigid vessel bottom plate 140 and a rigid vessel top plate 142. In FIG. 2b, the rigid vessel bottom plate 140 is shown in a plan view, and in FIG. 2c, the rigid vessel top plate 142 is shown in a plan view.

As visible in FIGS. 2a and 2e, the surge vessel 114 further comprises at least one supply pipe 144 penetrating the rigid vessel bottom plate 140. The supply pipe 144 has at least one portion 146 protruding into an interior space 148 of the surge vessel 114. The supply pipe 144 has further at least one inlet connecting branch 150 protruding from the vessel bottom plate 140 outside the interior space 148 for connecting the supply line 116 to the supply pipe 144.

Further, the surge vessel 114 comprises at least one outlet connecting branch 152. The surge vessel 114 may also comprise a plurality of outlet connecting branches 152. As illustrated in FIG. 2c, the plurality of outlet connecting branches 152 all may have identical diameters or, as in the embodiment shown, may also have differing diameters, such as at least two different diameters or more than two different diameters. Thus, the diameters of the outlet connecting branches 152 may generally be designed in a variable fashion and/or a plurality of outlet connecting branches 152 may be provided having differing diameters, such that a variable diameter may be chosen in accordance with the needs of the situation.

The at least one outlet connecting branch 152 protrudes from the rigid vessel bottom plate 140 outside the interior space 148 and is configured for connecting the at least one dispensing line 122. In case a plurality of connecting branches 152 is given, not necessarily all of the connecting branches 152 may be used. Thus, the surge vessel 114 may be designed as a disposable universal component for a plurality of uses, without the necessity of re-designing the surge vessel 114 in case different diameters of the connecting branches 152 are required. The connecting branches 152 may be connected in accordance with the respective requirements of the situation. Connecting branches 152 presently not in use may simply be closed, e.g., by using one or more valves, caps, stoppers or the like.

The surge vessel 114 may further comprise at least one pressure control branch 154, as specifically visible in FIGS. 2a and 2d. The pressure control branch 154 protrudes outside the interior space 148 and is configured for being connected directly or indirectly, e.g., via the at least one interface 137 in FIG. 1, to the pressure control line 118.

As discussed above, the time-pressure-filling system 110, specifically within the dispensing line 122 and/or within the dispenser 120, may comprise at least one manifold 134, such as a manifold 134 having a plurality of outlet ports 158. In FIG. 3, an exemplary embodiment of the manifold 134 is shown in a schematic side view. The manifold 134 may comprise at least one inlet port 156 which may be connected to the dispensing line 122 or to a first part of the dispensing line 122. Further, the manifold 134 may comprise a plurality of outlet ports 158, wherein the plurality of outlet ports 158 may have a smaller diameter than the inlet port 156. The outlet ports 158 may be connected directly to the at least one dispenser 120 and/or to at least one second part of the dispensing line 122 directly or indirectly connected to the dispenser 120. Thus, generally, the manifold 134 may be installed in the at least one dispensing line 122, e.g., in between surge vessel 114 and the dispenser 120 in FIG. 1, such as in between the surge vessel 114 and the pressure sensor 124, in between the pressure sensor 124 and the valve 126 or in between the valve 126 and the dispenser 120. Various options are feasible. Thus, manifold 134 may be configured for controlling the filling volume in the at least one dispensing line 122, such as by reducing the diameter of the dispensing line 122 and/or or may be configured for filling a plurality of containers 111 simultaneously. Further, as outlined above, the manifold 134 may be made of at least one rigid plastic material and, thus, may be configured for single use.

Figure 4:
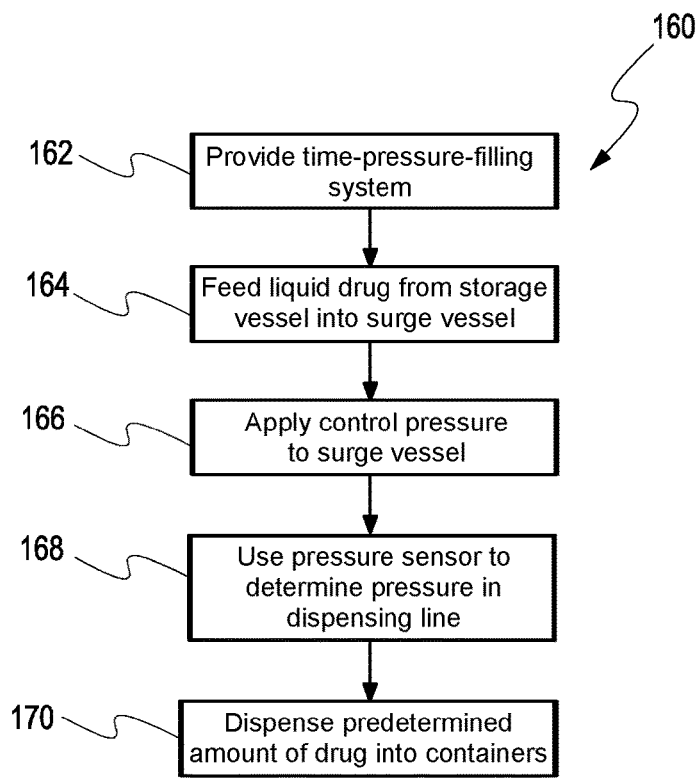
FIG. 4 shows a flow chart of an embodiment of a time-pressure-filling method for filling at least one liquid drug product into containers.

FIG. 4 shows a flow chart of an exemplary embodiment of a time-pressure-filling-method for filling at least one liquid drug product into containers 111, wherein the method is denoted by reference number 160. The time-pressure-filling method 160 comprises the following steps, which may specifically be performed in the given order. Still, a different order may also be possible. It may be possible to perform two or more of the method steps fully or partially simultaneously. It may further be possible to perform one, more than one or even all of the method steps once or repeatedly. The time-pressure-filling method 160 may comprise additional method steps that are not listed.

The time-pressure-filling method 160 comprises the following steps:
i. (denoted with reference number 162) providing the time-pressure-filling system 110, specifically comprising the at least one surge vessel 114;
ii. (denoted with reference number 164) feeding the liquid drug product from the storage vessel 112 into the surge vessel 114 in a pressurized fashion;
iii. (denoted with reference number 166) controlling the pressure in the surge vessel 114 by applying a control pressure to the surge vessel 114;
iv. (denoted with reference number 168) determining the pressure in the dispensing line 122 by using the pressure sensor 124; and
v. (denoted with reference number 170) dispensing predetermined amounts of the liquid drug product into the containers by controlling an opening time of the valve 126.

As outlined above, the time-pressure-filling system 110 may comprise the at least one optical sensor 117 and further the at least one control unit 123. The control unit 123 may be configured for detecting a filling level of the surge vessel 114 by evaluating at least one signal generated by the optical sensor 117. Thus, the control unit 123 may be configured for controlling the filling level of the surge vessel 114, for example, to at least one level value in a range of 25 to 75%, e.g., 30 to 60%, of the maximum filling capacity of the surge vessel 114. Thus, the control unit 123 may be configured for carrying out step ii. of the time-pressure-filling method.

Further, the control unit 123 may be configured for evaluating a signal generated by the pressure sensor 124 and, thus, for determining the pressure in the dispensing line 122. However, step iii. and step iv. of the time-pressure-filling method 160 may involve a regulation of the control pressure applied to the surge vessel 114. Thus, the control unit may be configured for controlling the applied control pressure in order to realize a predetermined pressure value. Further, the control unit 123 may be configured for controlling the opening time of the valve 126. Thus, it may be possible to dispense a predetermined amount of liquid drug product into the containers.

The time-pressure-filling method 160 may further comprise exchanging the surge vessel 114 after filling a batch of the liquid drug product, for example, after filling a predetermined amount of the liquid drug product, into containers. The surge vessel 114 may further be disposed of. For filling different batches, the time-pressure-filling method 160 may include using a plurality of surge vessels 114, specifically one after the other for the different batches.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS 110 time-pressure-filling system
111 container
112 storage vessel
113 outlet
114 surge vessel
115 pressure supply
116 supply line
117 optical sensor
118 pressure control line
119 connecting line
120 dispenser
121 Valve
122 dispensing line
123 control unit
124 pressure sensor
125 pressure supply
126 valve 128 isolator
130 sterile filter
132 point of fill
134 manifold
137 interface
138 rigid vessel sidewall
140 rigid vessel bottom plate
142 rigid vessel top plate
144 supply pipe
146 portion of the supply pipe
148 interior space
150 inlet connecting branch
152 outlet connecting branch
154 pressure control branch
156 inlet port of the manifold
158 outlet port of the manifold
160 time-pressure-filling method
162 providing the time-pressure-filling system
164 feeding the liquid drug product from the storage vessel into the surge vessel
166 controlling the pressure in the surge vessel
168 determining the pressure in the dispensing line
170 dispensing predetermined amounts of the liquid drug product into the containers

What is claimed is:

1. A time-pressure-filling system for filling liquid drug product into containers, comprising:
    a storage vessel configured for storing the liquid drug product;
    a surge vessel configured for single use and at least partially made of a rigid plastic material;
    a supply line configured for feeding the liquid drug product from the storage vessel into the surge vessel in a pressurized fashion;
    a pressure control line configured for applying a control pressure to the surge vessel;
    a dispenser configured for dispensing the liquid drug product into the containers;
    a dispensing line connecting the surge vessel to the dispenser;
    a pressure sensor configured for determining pressure in the dispensing line, wherein the volume of liquid drug dispensed is a function of the determined pressure in the dispensing line; and
    a valve configured for controlling flow of the liquid drug product through the dispensing line.

2. The time-pressure-filling system according to claim 1, wherein the time-pressure-filling system comprises a manifold having one inlet port and a plurality of outlet ports, wherein the plurality of outlet ports have a smaller diameter than the inlet port.

3. The time-pressure-filling system according to claim 1, further comprising a sterile filter.

4. The time-pressure-filling system according to claim 1, wherein the components of the time-pressure-filling system are connectable via couplings.

5. The time-pressure-filling system according to claim 1, wherein the time-pressure-filling system is surrounded by an isolator that provides a sterile surrounding for the time-pressure-filling system.

6. The time-pressure-filling system according to claim 1, further comprising a controller configured for at least one of: controlling filling level of the surge vessel, controlling the control pressure applied to the surge vessel, and controlling an opening time of the valve.

7. A time-pressure-filling method for filling at least one liquid drug product into containers, comprising:
    providing the time-pressure-filling system according to claim 1;
    feeding the liquid drug product from the storage vessel into the surge vessel in a pressurized fashion;
    controlling the pressure in the surge vessel by applying a control pressure to the surge vessel;
    determining the pressure in the dispensing line by using the pressure sensor; and
    dispensing predetermined amounts of the liquid drug product into the containers by controlling an opening time of the valve.

8. The method according to claim 7, wherein a batch of the liquid drug product is defined by a predetermined amount of the liquid drug product, wherein the method comprises exchanging the surge vessel after filling the batch of the liquid drug product into the containers and disposing of the surge vessel.

9. The method according to claim 8, wherein the time-pressure-filling system comprises a plurality of the surge vessels that are used one after another for different batches, wherein used surge vessels are disposed of.

10. A use of the time-pressure-filling system according to claim 1 for filling at least one of the following liquid drug product into containers: a pharmaceutical product; a steroid product; a liquid drug product for subcutaneous application; a liquid drug product for intravenous application; a high-potent liquid drug product; an aqueous protein solution.

11. A surge vessel for use in a time-pressure-filling system for filling liquid drug product into containers, wherein the surge vessel is configured for single use and is at least partially made of a rigid plastic material, the surge vessel comprising:
    a rigid cylindrical vessel sidewall;
    a rigid vessel bottom plate;
    a rigid vessel top plate;
    a supply pipe penetrating the rigid vessel bottom plate and having a portion protruding into an interior space of the surge vessel, wherein the supply pipe has an inlet connecting branch protruding from the rigid vessel bottom plate outside the interior space for connecting a supply line to the supply pipe, whereby the liquid drug is supplied to the surge vessel;
    an outlet connecting branch protruding from the rigid vessel bottom plate outside the interior space for connecting at least one dispensing line; and
    a pressure control branch protruding from the rigid vessel top plate outside the interior space for connecting at least one pressure control line.

12. The surge vessel according to claim 11, wherein the rigid plastic material comprises at least one material selected from the group consisting of polypropylene, polyethylene and polycarbonate.

13. The surge vessel according to claim 11, wherein the rigid plastic material is at least partially transparent.

14. The surge vessel according to claim 13, further comprising an optical sensor disposed outside the interior space, wherein the optical sensor is sensitive in at least one of the visible and the infrared spectral range.

15. The surge vessel according to claim 14, wherein the optical sensor is configured for detecting a filling level of the surge vessel.

* * * * *